United States Patent [19]

Ehrenfreund et al.

[11] 3,843,757

[45] Oct. 22, 1974

[54] PROCESS FOR EXTRUDING FOAMED THERMOPLASTICS BY UTILIZING AN INTERMESHING CO-ROTATING TWIN SCREW EXTRUDER

[75] Inventors: Herbert A. Ehrenfreund; Edward W. Cronin, both of Wilmington, Del.

[73] Assignee: Hercules Incorporated, New Castle County, Del.

[22] Filed: Nov. 15, 1967

[21] Appl. No.: 683,388

[52] U.S. Cl............. 264/53, 264/54, 264/68, 264/176, 264/349, 425/204, 425/208
[51] Int. Cl............. B29d 27/00, B29f 3/02
[58] Field of Search ............ 264/51, 53, 54, DIG. 5, 264/68, 176, 237, 349, DIG. 13; 18/12 SP; 425/204, 208

[56] References Cited
UNITED STATES PATENTS

| | | | |
|---|---|---|---|
| 2,563,396 | 8/1951 | Colombo | 18/12 SP |
| 2,987,774 | 6/1961 | Jacobson | 264/53 X |
| 3,138,825 | 6/1964 | Colombo | 425/204 |
| 3,188,264 | 6/1965 | Holden | 264/51 X |
| 3,287,477 | 11/1966 | Vesilind | 264/53 |
| 3,305,894 | 2/1967 | Boden | 18/12 SP |
| 3,310,617 | 3/1967 | Dygert et al. | 264/53 |
| 3,327,031 | 5/1967 | Boyer | 264/53 |
| 3,376,603 | 4/1968 | Colombo | 425/204 X |
| 3,382,536 | 5/1968 | Fritsch et al. | 425/204 X |
| 3,499,186 | 3/1970 | Sassa | 425/204 X |
| 3,522,628 | 8/1970 | Eberle et al. | 425/204 X |
| 3,632,256 | 1/1972 | Kasting et al. | 425/208 X |

FOREIGN PATENTS OR APPLICATIONS

| | | | |
|---|---|---|---|
| 1,090,785 | 11/1967 | Great Britain | |
| 1,416,667 | 9/1965 | France | |
| 1,062,684 | 3/1967 | Great Britain | 264/53 |

OTHER PUBLICATIONS

Smits, L.G.P. "Vented Extruders–A Review," S.P.E. Journal (Sept. 1964), p. 999–1002.
Scheiner, L. L. "Extruder Screws–Where we are. . . Where we're Headed," Plastics Technology, Nov., (1965) pp. 50–55.

Primary Examiner—Philip E. Anderson
Attorney, Agent, or Firm—Marion C. Staves; Sheldon F. Raizes

[57] ABSTRACT

A process for producing thermoplastic foam by the use of an intermeshing co-rotating twin screw extruder is disclosed. The thermoplastic polymer is mixed with other ingredients, such as blowing and nucleating agents, and extruded without being subjected to temperatures as high as encountered in extrusion processes using a single screw extruder or a counter-rotating twin screw extruder.

5 Claims, 1 Drawing Figure

PATENTED OCT 22 1974　3,843,757
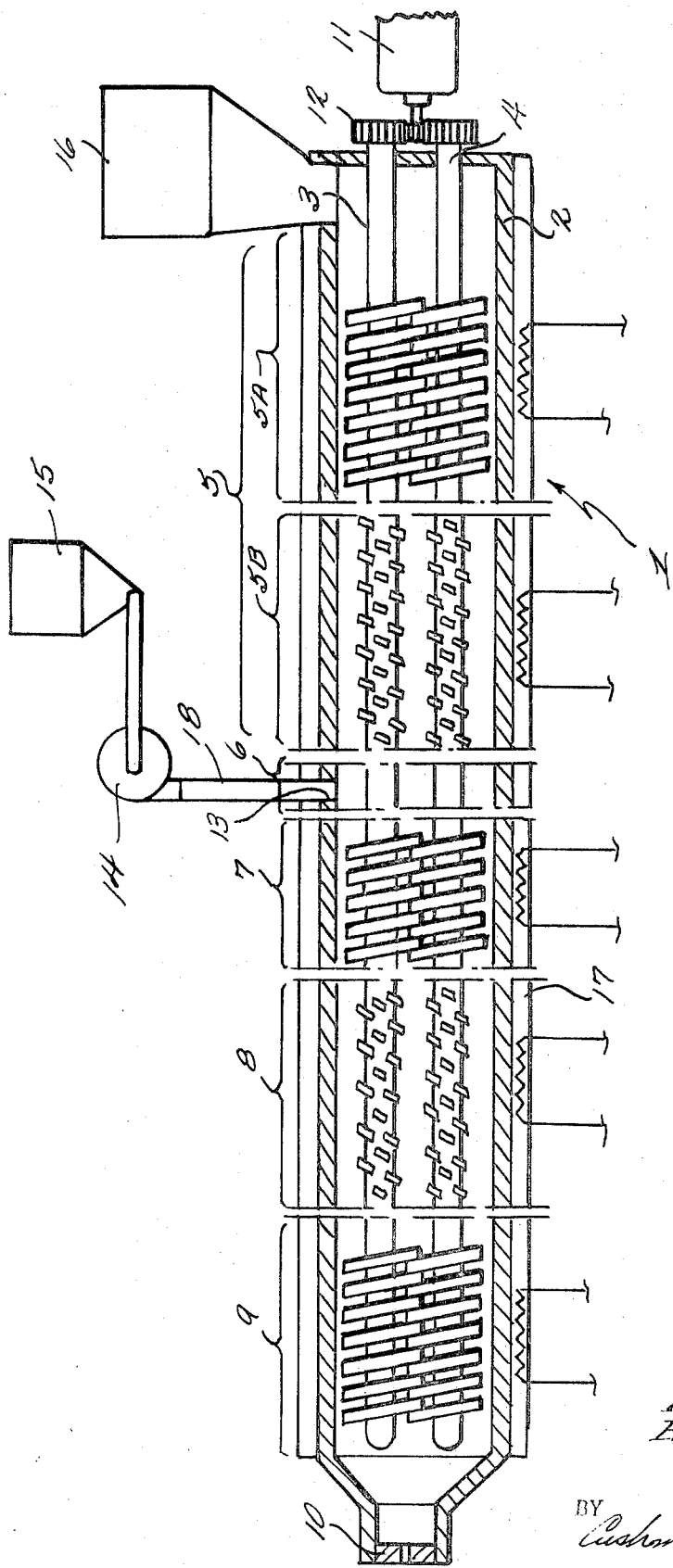
INVENTOR
HERBERT A. EHRENFREUND
EDWARD A. CRONIN
BY Cushman, Darby & Cushman
ATTORNEYS

PROCESS FOR EXTRUDING FOAMED THERMOPLASTICS BY UTILIZING AN INTERMESHING CO-ROTATING TWIN SCREW EXTRUDER

BACKGROUND OF THE PRIOR ART

The extrusion of thermoplastic foam is well known to the prior art. For instance, the Jacobson U.S. Pat. No. 2,987,774, patented June 13, 1961, describes a process for producing porous bodies of thermoplastic material by extrusion from a counter-rotating twin screw extruder. The Vesilind U.S. Pat. No. 3,287,477, patented Nov. 22, 1966, discloses a process for extruding a foamed thermoplastic using a single screw extruder. However, such prior art processes have required high power inputs due to the high shear involved.

In normal foam extrusion techniques using a single screw extruder or a counter-rotating twin screw extruder, it is necessary to impart enough BTu's per pound of thermoplastic foamable mixture to bring the temperature of the mixture substantially above the discharge temperature for proper mixing. However, a substantial amount of BTU's per pound of mixture must be extracted to lower the temperatures of the mixture for extrusion (extrusion at higher temperatures, generally results in collapsed foams, due to insufficient cell wall strength to withstand the pressure of the gaseous blowing agent).

In a typical direct injection single screw extruder system, extruding a high heat, general purpose styrene polymer foam, foamable polymer mixture temperatures of 400° to 450°F. will generally be encountered. BTU's must be extracted from this mixture to lower the mixture temperature to about 275°F. in the die, or discharge end.

The prior art has consistently taught that maximum shear should be applied to thermoplastic polymers during mixing and blending operations for foam systems. This high shear action has resulted in excessive polymer stock temperatures, which necessitates the problem of taking out BTU's to lower the stock temperature, and has also resulted in high operating expenses. For instance, in a typical single screw extruder, an extruder capacity of 125 hp (on the extrusion system) is required for a foam production of 300 pounds per hour. In a modified single screw extruder system, wherein a 4½ inch extruder screw feeds in line a 6 inch extruder screw, in the production of foamed thermoplastics, the extruder capacity will be 100 hp on the 4½ inch screw and 75 hp on the 6 inch screw, for a total hp requirement of 175, with a resultant extruder capacity of only 400 pounds per hour of foam.

The co-rotating twin screw extruder has been known for many years. The Colombo U.S. Pat. No. 3,252,182, issued may 24, 1966, describes such a co-rotating twin screw extruder. These co-rotating twin screw extruders have not been previously used in the production of foamed thermoplastics, as the prior art considered that high shear was required for adequate mixing. Co-rotating twin screw extruders are not normally used for non-foam extrusion of conventional materials, as a single screw extruder is considered to be much better in such applications.

SUMMARY OF THE INVENTION

Foamed thermoplastics are extruded from a conventional co-rotating intermeshing twin screw extruder, preferably modified by the provision of an inlet for the injection of a blowing agent. The use of the co-rotating twin screw extruder allows a significant energy savings and also results in a lower ultimate temperature encountered by the polymer during extrusion, as compared to single screw extruder and counter-rotating twin screw extruder temperatures. As much less heat is put into the thermoplastics foamable polymer mixture by the extruder, the requirements for extracting BTU's from the mixture can, in many cases, be eliminated.

DETAILED DESCRIPTION OF THE INVENTION

It has now unexpectedly been found that foamable thermoplastic resins may be extruded into foams on co-rotating twin screw extruder with much lower energy requirements than conventional foam extrusion systems. In addition, the highest temperature to which the thermoplastic polymer being extruded is subjected is much lower than the highest temperatures encountered in conventional foam extrusion systems.

The foamable thermoplastic resins which can be extruded according to the present invention include chlorinated rubber, cellulose ethers and esters, e.g., ethyl cellulose, cellulose acetate, cellulose acetatebutyrate, homopolymers of propylene, isobutylene, butene-1, vinyl halides, e.g., vinyl chloride and vinyl fluoride; vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, methyl alpha chloracrylate, ethyl acrylate, methyl methacrylate, acrylamide, acrylonitrile, methacrylonitrile, and interpolymers of the above-mentioned vinylidene monomers with alpha, beta unsaturated polycarboxylic acids and derivatives thereof, e.g., maleic anhydrides, diethyl maleate, dibutyl fumarate, diallyl maleate, dipropyl maleate, etc. A preferred class of materials are rigid, relatively nonelastic, thermoplastic resins, such as homopolymers and interpolymers of vinyl chloride, e.g., polyvinyl chloride, vinyl chloride-vinyl acetate copolymer (87:13), vinyl chloride-acrylonitrile copolymer (80:20); homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthalene and interpolymers of such vinylidene monomers with each other and with other vinylidene monomers in which the interpolymer contains at least 70 percent of the vinylidene aromatic hydrocarbon compound, e.g., a copolymer of 70 percent styrene and 30 percent acrylonitrile. One of the preferred class of resins is thermoplastic sytrene polymers containing at least 70 percent by weight of styrene in the structure.

When employing polystyrene, there can be employed normal crystal grade polystyrene or high impact polystyrene or a mixture containing 5 and 95 percent normal crystal grade polystyrene and the balance high impact polystyrene. When employing a thermoplastic sytrene polymer, it normally contains greater than 50 percent by weight of styrene and preferably at least 70 percent by weight of styrene in its structure. High impact polystyrenes are frequently prepared by polymerizing monomeric styrene in the presence of 2 to 15 percent by weight of a rubbery diene polymer or by polymerizing styrene in the presence of such amounts of a difunctional material. Examples of high impact styrene include a terpolymer of 5 percent acrylonitrile, 5 percent butadiene, and 90 percent styrene; a copolymer of 5 percent butadiene and 95 percent styrene; a copolymer of 5 acrylonitrile and 95 percent styrene; the product made by polymerizing 95 percent of stryene in the presence of 5 percent of polybutadiene; a copolymer of 5 percent chlorosulfonated polyethylene and 95 percent styrene; a blend of 97.5 percent polystyrene and 2.5 percent polybutadiene; a blend of 95 percent polystyrene and 5 percent hydrogenated polybutadiene containing 35.4 percent residual unsaturation; polystyrene formed in the presence of 5 percent hydrogenated polybutadiene containing 4.5 percent of residual unsaturation, a blend of 95 percent polystyrene and 5 percent polyisoprene, a blend of 98 percent polystyrene with 2 percent rubbery butadiene-styrene copolymer, a blend of 85 percent polystyrene with 15 percent of rubbery butadiene styrene copolymer and a copolymer of 99.5 percent styrene and 0.5 percent divinyl benzene.

Other suitable thermoplastic resins include polycarbonates, e.g., the polymer from bisphenol-A and diphenyl carbonate; polyoxymethylene (Delrin), oxymethylenealkylene oxide copolymers, e.g., oxmethyleneethylene oxide (95:5) polyurethanes, e.g., prepolymers from toluene diisocyanate and polypropylene glycol molecular weight 2,025; Dacron (polyethylene terephthalate), nylon (e.g. polymeric hexamethylene adipamide). ABS terpolymers can be used, e.g., the terpolymer of 25 percent butadiene, 15 percent acrylonitrile and 60 percent styrene (a rigid ABS terpolymer), as well as other terpolymers containing 25 to 60 percent butadiene, 10 to 20 percent acrylonitrile and 20 to 60 percent styrene, and fumarate and phthalate esters can also be used.

The invention is of particular value in the production of foams from polyethylene (of high density, e.g. 0.960, medium density, e.g. 0.935 or low density, e.g. 0.914), polypropylene, copolymers of ethylene and propylene (e.g., 50:50 copolymer, 60:40 copolymer and 20:80 copolymer) regular or high impact polystyrene, acrylonitrile-butadiene-styrene terpolymer, polyvinyl chloride (preferably rigid polyvinyl chloride), copolymers of ethylene with minor amounts of butene-1 (e.g., 90:10 and 97.5:2.5); terpolymers of ethylene, propylene and up to 5 percent of a nonconjugated polyolefin such as pentadiene-1,4 and dicyclopentadiene, e.g., a terpolymer of 60 percent ethylene, 39 percent propylene and 1 percent alloocimene or pentadiene-1,4.

There can also be used fluorocarbon polymers such as polytetrafluoroethylene, polyhexafluoropropylene, polymers of vinylidene fluoride, and tetrafluoroethylene-hexafluoropropylene copolymer (e.g., 50:50).

Mixtures of thermoplastic polymers may be utilized if desired.

The foaming or blowing agent, which is preferably a volatile liquid which volatilizes at a temperature below the softening point of the polymer, may be injected into the extruder barrel at a suitable point and distributed throughout the thermoplastic polymer by the mixing action of the extruder screws. The volatile liquid, or other foaming agent, should be non-reactive with the thermoplastic polymer and should not have more than a slight solvent action on the thermoplastic polymer.

As the volatile liquid there can be used aliphatic hydrocarbons boiling between 10° and 100°C. and preferably between 30° and 90°C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, methyl chloride, butane, acetone, methyl formate, ethyl formate, dichloroethylene, perchloroethylene, dichlorotetrafluoroethane, isopropyl chloride, propionaldehyde, diisopropyl ether dichlorodifluoromethane, a mixture of pentane with 5 to 30 percent of methylene chloride or other volatile lower halogenated hydrocarbon.

Usually, the amount of volatile liquid will be 0.1 to 50 percent by weight of the polymer, e.g., polystyrene, to be expanded. The amount of volatile liquid will depend upon the extent of foaming desired. In general, the greater the amount of absorbed volatile liquid in the polymer-absorbent mixture the more expansion. It has been found that good expansion can be obtained using very small amounts of the volatile liquid.

To insure formation of a uniform, small cell size foam, a nucleating agent may be incorporated in the thermoplastic prior to foaming.

When a nucleating agent is employed, it is used in an amount of from 0.02 to 10 percent of the total thermoplastic by weight. Preferably, 0.4 to 2 percent of the nucleating agent is used.

Conventionally, the nucleating agents are made of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is insufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium hydrogen phosphate, fumaric acid, malonic acid, oxalic acid, citric acid, tartaric acid, potassium acid tartrate, chloracetic acid, maleic acid, succinic acid and phthalic acid. In place of the anhydrous acids or salts there can be used the solid hydrates, e.g., oxalic acid dihydrate and citric acid monohydrate. It should be understood that other well known nucleating systems can be utilized.

While not essential, there can also be added a wetting agent such as Bayol 35 (a petroleum aliphatic hydrocarbon white oil), kerosene having an average of at least 8 carbons in the molecule, alkylphenolalkylene oxide adducts, e.g., Triton X-100 (t-octylphenolethylene oxide adduct having 10 ethylene oxide units in the molecule), sodium lauryl sulfate and sodium dodecylbenzene sulfonate. The wetting agent can be nonionic or anionic.

While any of the thermoplastic polymers heretofore mentioned may be utilized in the process of the present invention, particularly preferred thermoplastics include polystyrene, polyethylene (of low, medium, and high densities) and polyvinylchloride polymers c ontaining up to about 30% of other co-monomers.

In addition to the volatile liquid foaming agent, other materials may be incorporated in the thermoplastic polymer. For instance, various inert fillers, stablizers and extenders may be utilized. In addition, pigments and dyes may be incorporated into the thermoplastic polymer foam, as is known to the art.

Instead of injecting the volatile liquid blowing agent into the thermoplastic polymer in the extruder, a conventional expansible thermoplastic material, such as polystyrene containing about 1–9 percent of one or more of the volatile liquids, e.g., Dow Pelaspan 101(expansible polystyrene beads containing 6 percent pentane) or Kopper Dylite F–135, may be used.

The foam extrusion conditions for the co-rotating twin screw extruder are conventional, as is known to the art, except that the extruder temperatures will generally be appreciably lower than those encountered in extrusion with single screw extruders and counter-rotating twin screw extruders. The thermoplastic polymer is subjected to sufficient BTU's in the compression zone of the extruder so that the cooling effect of the blowing agent when injected into the system will be sufficient to bring the polymer mixture (including the blowing agent) to substantially the desired discharge temperature at the die thereby eliminating the necessity of extracting BTU's from the foamable polymer mixture or in some instances removing very little BTU's from the foamable polymer mixture. The discharge temperature will vary over wide limits, depending upon the particular thermoplastic polymer extruded and the foamed product desired. For instance, branched polyethylenes of a softening point of 210°F. will generally be extruded at about 150°F. whereas polystyrene, of a softening point of 215° F. will generally be extruded at a temperature of about 250° – 300°F., polypropylene homopolymers and co-polymers with butene, of softening points of about 370°F. will generally be extruded at temperatures of about 230° – 250°F. and about 225°F., respectively. Linear polyethylene (0.94 – 0.96 density) which has a softening point of 270°F. will be extruded at about 200° – 210°F. Polyvinylchloride, of softening points of about 220°F. will generally be extruded at temperatures of about 275° – 300°F. The above extrusion temperatures indicate that the preferred thermoplastic polymers will generally be extruded at a temperature between about 150°F. below the softening temperature of the polymer and about 200°F. above the softening temperature of the polymer being extruded. However, it is emphasized that the extrusion temperatures, in specific instances, may be well below or above the above-mentioned range.

A conventional co-rotating twin screw extruder with flights continously forwarding except where material is transferred from one compression section to another because of machining limitations can be utilized. This screw configuration tends to limit extrusion capacity. At this capacity sufficient sealing by the polymer takes place to prevent gaseous blow-back of an injected blowing agent. The portion of the compression zone of the screw near the feed zone is partially filled with polymer and the portion thereof near the injection zone is substantially filled with polymer whereby the polymer acts as a seal to prevent gaseous blow-back of the injected blowing agent. This sealing action is effected by adjustment of screw rotation speeds. It has been found that when extrusion capacity has been increased there is insufficient sealing by the polymer to prevent blow-back when continuous flight screws are utilized.

A preferred co-rotating twin screw extruder for larger capacities is shown on the accompanying diagram, which represents a schematic view of a co-rotating twin screw extruder suitable for the production of foamed thermoplastics.

Co-rotating twin screw extruder 1 comprises an extruder barrel 2 surrounding twin screws 3 and 4. Each extruder screw 3 and 4 is of normal design, i.e., is of conventional pitch, L/D ratio, and the like, except for the design of the mixing sections, as will be described more fully hereinafter.

Each screw consists of a compression zone 5 comprising a section 5A of forwarding mixing flights and a gaseous sealing section 5B of reversing flights, an injection zone 6, a conveying zone 7, a mixing zone 8, and a metering zone 9. The extruder 2 contains a die 10 which contains suitable ports (not shown), as known to the art. A motor 11 drives gears 12, causing screws 3 and 4 to rotate in the same direction, i.e., the screws are co-rotated. Injection port 13 is connected by way of a conduit 18, containing a pump 14, to a volatile liquid blowing agent storage vessel 15. The volatile liquid blowing agent is injected into the extruder barrel in injection zone 6. The hopper 16 feeds stock thermoplastic polymer to the extruder in a conventional manner, e.g., by way of a single screw conveyor or other suitable metering device. The extruder barrel 2 is surrounded by a heating jacket 17, which is preferably divided into a plurality of zones, i.e. five differing heating zones, for polymer temperature control. The heating means is preferably electricity but other sources of heating may be utilized.

In operation the thermoplastic polymer, which is suitably in pellet form, is metered from hopper 16 into the rear of the extruder barrel and introduced into and passed through section 5A of screws 3 and 4 to section 5B with the section 5A only partially filled with polymer. The screw flights of section 5B are reversed with respect to the screw flights of section 5A, and the pitch of screw flights in section 5B is less than the pitch of the screw flights in section 5A. The screw threads section 5B are interrupted by gaps, with the gaps in subsequent turns of the thread being helically aligned with each other so as to provide helical paths for the thermoplastic polymer, in the same direction as the feed section 5A. The reverse flights of section 5B impart more intense mixing to the polymer than section 5A. A more important feature of section 5B is that it assures that the flights of the screws at that section will be substantially filled with polymer. Therefore, the location of the reversing flights adjacent the injection zone 6 provides a polymer seal to prevent gaseous blow-back of the injected blowing agent. A suitable design for mixing zones 5B and 8 is illustrated in the Colombo U.S. Pat. No. 3,252,182, the disclosure of which is hereby incorporated by reference. However, other extruder compression zone screw designs may be utilized, as is known to the art. For example, the reverse flight screw threads may be replaced by a section of screws 3, 4 wherein the screw pitch and/or diameter is changed, as is conventional in the art, to ensure that the screw is substantially filled with polymer at at least one point between the polymer feed inlet from hopper 16 and blowing agent injection port 13, thereby providing a seal against gaseous blow-back.

In injection zone 6, the blowing agent is introduced into the system and the thermoplastic polymer is then mixed with the volatile liquid blowing agent and the volatile liquid blowing agent is uniformly distributed throughout the polymer, due to the action of the extruder screws. This mixing action is assisted by the action of the screws in conveying zone 7 and mixing zone 8. The polymer is passed through mixing zone 8 and thence through metering zone 9 to the extruder die 10. Mixing zone 8 serves incidentally as a seal against premature release of volatile blowing agent to the front of the extruder. However, in many cases, the mixing zone 8 can be eliminated if intense mixing is not required at this point. The polymer mixture fills several screw flights of the metering section 9 adjacent the die and therefore acts at that point as a seal against premature release of blowing agent. The die design may be any of the conventional extruder die designs utilized by the art in the production of foamed thermoplastics—e.g., the extruder die may be designed to produce foam sheets, rods, chunks, or annular coverings of cables or the like.

It is believed that the co-rotating twin screw extruder produces an entirely different type of mixing than other extrusion systems. The single screw extruder and the counter-rotating twin screw extruder produces a grinding, tearing, and high shear mixing effect, while the co-rotating twin screw extruder produces a cut and blend type of mixing. This mixing effect is believed to be the reason why much lower temperatures are encountered in co-rotating twin screw extruders.

In a co-rotating twin screw extruder, an energy balance analysis indicates that of the heat found in the polymer at the extruder die, substantially more heat is imparted to the polymer by the heating means surrounding the extruder barrel than that imparted to the polymer by the same means in a single screw or counter-rotating twin screw extruder. Therefore, the amount of heat or BTU's added to a polymer can be effectively controlled to a minimum and in the extrusion of conventional thermoplastic polymer foams by the process of the present invention, there is generally no requirement for heat removal and therefore no cooling means is required.

It is known to be difficult to put heat into, or remove heat from, polystyrene polymers. The working of the polymer in a conventional single screw extruder or a counter-rotating twin screw extruder adds heat to the polymer which has to be removed by barrel cooling means. Since in utilizing the process of the present invention, very low controlled heat is imparted to the polystyrene polymer by the co-rotating twin screw extruder, and no heat removal is generally required, more even density and/or foam sheet gauges may be obtained than that obtained from a single counter-rotating twin screw extruder.

The foam extrusion process utilizing the co-rotating twin screw extruder requires much less energy than a single screw or counter-rotating twin screw extruder for the same foam capacity. For example, a co-rotating twin screw extruder having 5 hp on the drive system has a capacity of 60 pounds per hour of foam and a co-rotating twin screw extruder having 20 hp on the drive system has a capacity of 300 pounds per hour of foam. As a result, the capital equipment investment required for a given design capacity is in some instances about one-half than that required for conventional foam extrusion systems.

The thermoplastic foams produced by the present process may be utilized in a wide variety of areas, as is known to the art. For instance, the polymers may be used for insulation and as the core of sandwich panels. They may also be welded or cemented into various useful products, such as, for instance, milk cartons. The extruded thermoplastic foams may be used for floatation in boats and the like. Most of the extruded thermoplastic foams may be used in the packaging industry. From the above it will be readily appreciated that the products produced by the process of the present invention are useful in a wide variety of applications.

The invention will be understood more readily by reference to the following examples; however, these examples are intended to illustrate the invention and are not to be construed to limit the scope of the invention.

Example 1

The following example was conducted on a LMP-Colombo co-rotating intermeshing twin screw extruder, Model RC10, containing two special alloy steel screws with continuously forwarding flights except where material is transferred from one compression section to another. The screws had a maximum diameter of 4.48 inches, a L/D ratio of 5.5:1 and a center to center distance of 3.35 inches. The barrel had two heating zones, with heating means of electrically operated heater bands of a total capacity of 4.5 kw. The feeding was by way of a separately driven screw from a 1.23 cubic foot capacity hopper. Expandable polystyrene pellets (Koppers F–135) with the following properties were extruded:

| | |
|---|---|
| Bulk Density, pck | 29 |
| Pellet length, inches | ⅛ |
| Pellet diameter, inches | 1/16 |
| Total volatile content, %wt. | 6.3 max. 5.5 min. |
| Citric acid content, %wt. | 0.30 |
| Sodium bicarbonate content, %wt. | 0.35 (external) |

During extrusion, the pressure behind the die was 1,000 psi and the screw was starved. The extruder barrel temperature was 320°F. at the feed zone and 340°F. at the discharge end of the barrel. (The maximum barrel temperature was 340°F.) The stock temperature at the die was 275°F. 57.5 pounds per hour of 8 pound density foam of good, uniform appearance and fine cell size was produced. The extruder had a 5 hp drive. No heat extraction means was employed on the system.

EXAMPLE 2

Using the extruder of Example 1 modified by adding a blowing agent injection port in the barrel, a low density branch chain polyethylene resin (duPont Alathon 14) with the following physical properties was used:

| | |
|---|---|
| Melt index, dg./min. | 1.9 |
| Density, 23°C. g./cc | .915 |
| Tensile Strength | 1700 – |

| | -Continued | |
|---|---|
| 73°F., lb./sq.in. | 1800 |
| Yield Point, 73°F., lb./sq.in. | 1500 |
| Elongation, 73°F., % | 3500 |
| Hardness, Shore. | D 45 |
| Softening point Vicat, °F. | 182 |
| Dielectric constant, 60 cycles to 100 megacycles | 2.3 |
| Index of refraction, $n_D$ | 1.51 |
| Specific heat | 0.55 |
| Coefficient of linear expansion, per °F. | $9 \times 10^{-5}$ |

100 parts of the above polyethylene resin, 0.2 parts of calcium silicate (nucleating agent) and 0.25 parts of zinc stearate (lubrication or mixing aid) were dry mixed in a drum tumbler for 15 minutes and then placed in the extruder hopper. The blowing agent was 6 parts (based on the total mixture above) of a petroleum ether consisting of 60 percent pentane, 20 percent heptane and 20 percent hexane. The blowing agent was injected into the third, or injection zone. The extruder barrel temperature was 340°F. at the feed zone, 420°F. at the blowing agent injection zone, and 420°F. at the discharge zone and the stock temperature at the die was 170°F. The pressure behind the die was 500 psi and the screw was starved. 48 pounds/hour of a low density foam was obtained. No heat extraction means was employed on the system.

Example 3

The extruder described in Example 2 was utilized to extrude a high heat general purpose polystyrene (Foster Grant Fosterene 50). The styrene together with 0.2 percent citric acid and 0.2% NahCO$_3$ (nucleating agent) were dry mixed in a drum tumbler for 15 minutes and then fed into the extruder. Six parts (based on the total mixture above) of petroleum ether was injected into the extruder barrel. The styrene polymer had the following properties:

| | |
|---|---|
| Specific gravity | 1.04 – 1.07 |
| Hardness, Rockwell | M70 – M80 |
| Moisture absorption, % | 0.04 |
| Tensile strength, psi | 7000 – 8000 |
| Elongation, % | 1.5 – 3.5 |
| Tensile modulus psi × 10$^5$ | 4.0 – 5.0 |
| Flexural strength, psi at yield | 1200 – 1300 |

The pellets were approximately one-eighth by one-eighth inch with an apparent bulk density of 0.61.

The pressure behind the die was 1,200 psi and the screw was starved. The extruder barrel temperature was 300°F. in the feed zone, 330°F. at the blowing agent injection zone and 300°F. at the discharge end and the stock temperature at the die was 275°F. 66.5 pounds per hour of good foam of 10 to 11 pounds per cubic foot density was produced. No heat extraction means was employed on the system.

EXAMPLE 4

A co-rotating intermeshing twin screw extruder shown in the accompanying drawing and similar to the extruder of Example 1 but of a relatively larger capacity (LMP-Colombo Model RC18) was used to extrude the high heat polystyrene described in Example 3. The screws were of a maximum diameter of 4.48 inches, a L/D ratio of 16:1, and a center to center to center distance of 3.35 inches. A blowing injection port was added. The barrel had five heating zones, with heating by means of electrically operated heater bands of a total capacity of 20.45 kw. The hopper capacity was 2.82 cubic feet. 100 parts of the styrene polymer, 0.1 parts of citric acid and 0.1 parts of NaHCO$_3$ were dry mixed in a drum tumbler for 15 minutes and then passed in the extruder. The blowing agent, a petroleum ether consisting of 60 percent pentane, 20 percent heptane, and 20 percent hexane, was used in an amount of six parts based on 100 parts of the polymer mix. The pressure behind the die was 1,150 psi and the screw was starved. The extruder barrel temperatures were 410°F. in the feed zone, 430°F. in the mixing zone, 412°F. in the blowing agent injection zone, 325°F. in the discharge zone and the stock temperature was 290°F. at the die. 270 pounds per hour of 5.16 pounds per cubic foot foam were produced. The capacity of the extruder drive was 20 hp. No heat extraction means was employed on the system.

EXAMPLE 5

The extruder described in Example 4 was used to extrude a polymer from a high heat medium-impact polystyrene (Foster Grant Fosta Tuf-Flex 352) of the following physical properties:

| | |
|---|---|
| Tensile strength, psi | 4200 |
| Elongation, % | 14 |
| Tensile modulus psi × 10$^5$ | 4.0 |
| Vicat, Softening Point, °F. | 218 |

100 parts of the polymer, 0.2 parts citric acid and 0.2 parts of NaHCO$_3$ were dry mixed in a drum tumbler for 15 minutes and then passed to the extruder. The blowing agent, which was utilized in an amount corresponding to 5 parts per 100 parts of the polymer mixture, was pentane. The pressure behind the die was 1050 psi and the screw was starved. The extruder barrel temperatures were 440°F. in the feed zone, 425°F. in the mixing zone, 390°F. in the blowing agent injection zone, 300°F. in the mixing zone, 300°F. at the discharge zone and the stock temperature was 305°F. at the die. 200 pounds per hour of 6 – 8 pounds per cubic foot density good foam were produced. No heat extraction means was employed on the system.

EXAMPLE 6

The polymer described in Example 5 was extruded on the co-rotating intermeshing twin screw extruder described in Example 4. 100 parts of the styrene polymer, 0.2 parts of citric acid and 0.2 parts of NaHCO$_3$ were dry mixed in a drum tumbler for 15 minutes and then passed to the extruder. The blowing agent was pentane, used at a level of 5 parts per 100 parts of the total polymer mixture. The pressure behind the die was 1,150 psi and the screw was starved. The extruder barrel temperatures were 450°F. in the feed zone, 480°F. in the mixing zone, 420°F. in the injection zone, 312°F. in the mixing zone, and the stock temperature was 250°F. at the die. 250 pounds per hour of a good quality low density foam were produced. No heat extraction means was employed on the system.

It should be noted that in all of the examples BTU's were not removed from the polymer mixture prior to discharging the mixture from the extruder. In all cases except Example 1, which was the extrusion of a foamable pellet, and Example 2, the amount of heat or BTU's added to the polymer prior to the injection zone was so controlled that the cooling effect of the blowing agent when injected into the system was sufficient to bring the polymer mixture (including the blowing agent) to substantially discharge temperature. In Example 2, additional BTU's were added by the heaters to the polymer and blowing agent mixture to bring the mixture substantially the discharge temperature. Obviously minor heat losses through radiation, etc., as well as subsequent working on the polymer mixture by the screws must be taken into account when considering the actual discharge temperature. The preferred embodiment of the present invention is, as discussed heretofore, to add substantially all of the BTU's from external heating means to the polymer stock prior to the injection of the blowing agent. Such a procedure allows greater control over the extrusion process. However, it is possible to add a portion, or even all, of the BTU's to the polymer stock after the blowing agent has been injected. (Adding a portion of the BTU's after the blowing agent has been injected is illustrated in Example 2.) In any case, the total energy balance (heat added to the polymer stock minus the cooling effect of the blowing agent injection and minus any heat losses) must be such that the resultant polymer stock temperature is the desired extrusion discharge temperature or foaming temperature.

While the preferred embodiment of the present invention contemplates no external cooling means on the extruder barrel for BTU removal purposes, e.g., no heat from the polymer stock subsequent to the blowing agent injection, other than minor heat losses caused by radiation, conduction and the like, it may in some instances be desired to utilize cooling means, such as a water jacket, on the extruder barrel between the blowing agent injection port and the die for removal of BTu's from the polymer stock. In any event the maximum polymer stock temperature (polymer/blowing agent mixture temperature) will always be substantially less than the temperatures encountered in the same extrusion systems when extruding on a single screw or counter-rotating twin screw extruder.

The term "discharge temperature" as used herein shall mean the temperature which is low enough that the polymer cell walls are strong enough to withstand the pressure of the gaseous blowing agent without rupturing and a temperature which is high enough to cause the volatile blowing agent to volatilize.

The term "starved screw" as used in the examples means that the screws are run partially filled with polymer except in the area of the extruder in Example 2 adjacent to and upstream of the injection port which is run substantially full to effect sealing and prevent gaseous blow-back, in the areas of the extruder illustrated in the drawing where the reversing flights are located, and in each extruder the last few flights of the metering zone nearest the die which will be filled with polymer due to back pressure at the die.

Obviously many modifications and variations of the present invention are possible in the light of the above teachings. It is, therefore, to be understood that within the scope of the appended claims, the invention may be practiced otherwise than as specifically described.

We claim:

1. In a process for extruding a thermoplastic polymer comprising extruding a foamable thermoplastic polymer on an extruder while injecting a blowing agent into the extruder, uniformly distributing the injected blowing agent into the polymer, and adding heat to said polymer, the improvement comprising passing said polymer during extrusion between intermeshing screw flights of a twin screw intermeshing co-rotating extruder while limiting the amount of heat added to the polymer during extrusion so that the cooling effect of the blowing agent when injected into the extruder and uniformly distributed within the polymer, will bring the polymer and blowing agent mixture to substantially the discharge temperature.

2. A process as claimed in claim 1 wherein no heat is removed by external means from the polymer and blowing agent mixture prior to discharging said mixture from said extruder screws.

3. A process as claimed in claim 1 wherein heat is added to the polymer by working of the polymer between screws and by external heating means, and all heat from said external heating means is added to the polymer prior to injection of the blowing agent.

4. In a process for producing a thermoplastic comprising extruding foamable thermoplastic polymer on an extruder while injecting a blowing agent into the extruder, and discharging the polymer and blowing agent mixture from the extruder at a predetermined discharge temperature to form said foamed thermoplastic, the improvement comprising rotating two parallel extruder screws the flights of which intermesh in the same direction (co-rotating), passing said foamable thermoplastic polymers between said co-rotating screws while mixing said blowing agent into the polymer, adding heat to the polymer during passage between said screws by working the polymer with the screws and by external heating means, limiting the amount of heat added to the polymer by said external heating means so that the cooling effect of the blowing agent, when mixed into the polymer, will bring the polymer and blowing agent mixture to substantially the discharge temperature, whereby excessive heating, which would require subsequent removal by external cooling means of a substantial amount of excessive heat from the polymer and blowing agent mixture, is avoided.

5. A process as claimed in claim 4, wherein all of the heat from the external heating means is added to the polymer prior to mixing said blowing agent therein.

* * * * *